United States Patent

[11] 3,590,824

| [72] | Inventors | Lyman J. Gunyou<br>Celina;<br>Robert A. Stelzer, Coldwater, both of, Ohio |
|---|---|---|
| [21] | Appl. No. | 803,393 |
| [22] | Filed | Feb. 28, 1969 |
| [45] | Patented | July 6, 1971 |
| [73] | Assignee | Avco Corporation<br>Coldwater, Ohio |

[54] CORN SHELLER AND SEPARATOR
12 Claims, 4 Drawing Figs.

| [52] | U.S. Cl. | 130/6 |
|---|---|---|
| [51] | Int. Cl. | A01f 11/06 |
| [50] | Field of Search | 130/6, 8, 27.17 |

[56] References Cited
UNITED STATES PATENTS

| 1,138,779 | 5/1915 | Oeth | 130/6 |
|---|---|---|---|
| 2,271,898 | 2/1942 | Mast | 130/6 |
| 2,927,587 | 3/1960 | Arms | 130/6 |
| 3,401,727 | 9/1968 | Blanshine et al. | 130/6 X |

*Primary Examiner*—Antonio F. Guida
*Attorneys*—Charles M. Hogan and Gary M. Gron ABSTRACT: The disclosure illustrates a corn sheller and separator comprising a uniform-diameter, elongated cylinder journaled for rotation in first and second perforated cages placed end to end. Unshelled corn is received at one end of the first cage and a series of teeth projecting radially from the cylinder propel the corn through the first cage. The clearance between the teeth and the first cage is selected to promote vigorous rubbing and removal of kernels from the ear of corn. To provide even more effective removal of the kernels the first cage has a series of longitudinal recesses and a longitudinal rasp bar positioned between two recesses. The second cage forms with the cylinder a much greater clearance than the clearance for the first cage so that the remaining kernels of corn, trash and cobs are maintained in a looser mixture. A series of paddles pitched with respect to the axis of the cylinder propel the mixture in a helix pattern through the second cage so that the remaining kernels are separated from the corn.

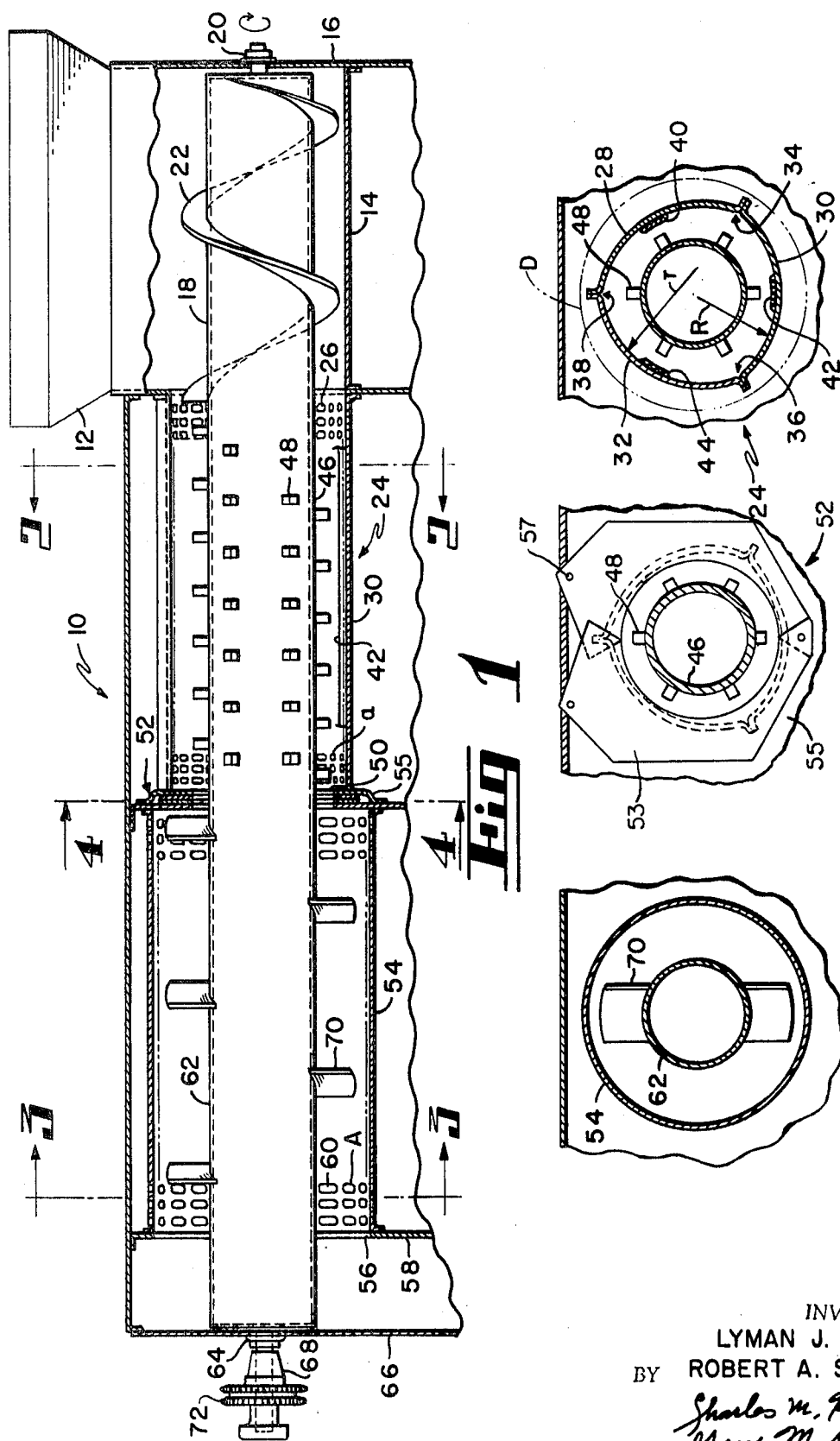

CORN SHELLER AND SEPARATOR

The present invention relates to corn-processing machinery and more particularly to corn shelling and separating machinery.

Devices for mechanically removing kernels of corn from ears and separating the kernels from the cob are well known in the art. A typical machine which performs this operation is illustrated in the U.S. Pat. to E. P. McCreery, No. 2,754,827, granted July 17, 1956 . In that patent there is provided an elongated rotor journaled for rotation in a perforated cylindrical cage. Radial teeth of various heights are positioned in a helix pattern on the cylinder to propel ears of corn through the cage upon rotation of the cylinder. In the first portion the kernels are removed from the cob and in the second portion the kernels are separated from the cobs and trash of the ears. The kernels, removed from the ears or separated from the cobs and trash, pass through the perforations in the cages to a suitable collection device. The machine illustrated in the McCreery patent processes corn at extremely high rates by providing a clearance between the perforated cage and the cylinder approximately equal to the thickness of two ears of corn. In this fashion a double layer of corn is maintained in the sheller to greatly increase the shelling capacity.

While machines of this type are well suited for high-volume stationary work, they have certain deficiencies when applied to field work wherein a sheller is employed directly behind a corn-harvesting device in the field. One problem with this type of operation is that the available supply of corn can vary widely, e.g., when the machine passes fallen stalks or stalks with no ears of corn thereon. In such a device the variable feed tends to make shelling ineffective since the corn is not packed into the cage and not subjected to a continuous rubbing action. To alleviate this condition, machines of this type utilize a barrier in the perforated cage to restrict the flow of corn and attempt to pack it more in the first portion of the cage. While this approach tends to improve the shelling operation, it is not sufficient enough for the widely varying rates experienced in the field.

A second problem arising in the field is that the amount of trash carried along with the corn, i.e., broken stalks, leaves, etc., is substantially greater than the trash experienced in a stationary operation where the corn has already been picked and processed to the extent that a large portion of the trash is removed. It has been found that the wide clearance coupled with the large amounts of trash reduces the effectiveness of such a shelling action.

Accordingly, it is a prime object of the present invention to provide a corn sheller and separator of the above general type that is efficient and highly effective for use in field-going operations.

The above ends are achieved by a corn sheller and separator which comprises a means for forming a first generally annular perforated cage adapted to receive, at one end, ears of corn. A first elongated cylinder having teeth projecting radially therefrom in a helix pattern is longitudinally journaled for rotation in the perforated cage means. The dimensions of the cylinder, teeth and first cage means are selected to form annular spaces so that rotation of the cylinder causes ears of corn to be advanced through the cage means and vigorously rubbed against one another and the perforated cage means. This causes the kernels to be separated from the cob and trash of the ear, thereby permitting a portion of the kernels to pass outwardly through the perforations in the first cage means.

A means is provided for forming a second generally annular perforated cage extending from the opposite end of the first cage means and having an open end for discharge of trash and cobs. A second cylinder extends from the first cylinder, through the second cage means and is journaled for rotation therein. The second cylinder and second cage means form an annular space substantially greater than the annular space between the first cage means and the first coaxial cylinder to permit a loose mixture of kernels, ears and trash. A means, extending radially from the second cylinder to a position closely adjacent the second cage means, propels the remaining kernels, trash and cobs in a helical pattern through the second cage means so that the remaining kernels pass outwardly through the perforations of the second cage means.

The above and other related objects and features of the invention will be apparent from a reading of the following description of the disclosure found in the accompanying drawing and the novelty thereof pointed out in the appended claims.

In the drawing:

FIG. 1 is a longitudinal section view of a corn sheller and separator embodying the present invention;

FIG. 2 is a cross-sectional view taken on lines 2–2 of the sheller and separator shown in FIG. 1;

FIG. 3 is a cross-sectional view taken on lines 3–3 of FIG. 1.

FIG. 4 is a cross-sectional view taken on lines 4–4 of FIG. 4.

Referring now to FIG. 1 there is shown a corn sheller and separator 10. This sheller and separator is typically mounted in a field-going corn-harvesting unit which has an ear-gathering unit that removes ears of corn from stalks and feeds them to the corn sheller and separator 10. Once the sheller and separator 10 separates the kernels from the cobs and trash of the corn ears, the separated kernels are subjected to a final separating process that removes very light trash material. The corn is then conveyed by suitable conveying devices to a storage hopper or to a storage wagon pulled alongside the field-going unit. It should be apparent to those skilled in the art that the corn sheller and separator now to be disclosed may be incorporated in a device such as the one described above and that a detailed discussion of its employment for this purpose is not necessary for a proper understanding of the present invention.

The corn sheller and separator 10 receives unshelled ears of corn at an inlet end via a suitable hopper 12. The hopper 12 opens to a generally cylindrical feed chamber 14 secured to an end plate 16 providing a major support for the sheller. A cylinder 18 is journaled for rotation in the chamber 14 by a suitable bearing assembly 20. The cylinder 18 has an auger 22 secured thereon so that rotation of the cylinder 18 in the direction illustrated in FIG. 1 causes ears of corn to be advanced to the inlet end of a shelling cage 14.

The shelling cage 24 is formed from three symmetrical arcuate sections 28, 30 and 32, suitably bolted together along their length. As shown in FIG. 2, each of the arcuate sections has a radius $r$ greater than the average R for the resultant generally annular structure formed by the sections. This forms a series of longitudinal shallow recesses 34, 36, 38 at the junction between the sections. Rasp bars 40, 42 and 44 may be positioned at approximately equal distances between adjacent recesses. The shelling cage 24 has a plurality of perforations 26 around its periphery. These perforations 26 have a predetermined area $a$, as later described.

A second cylinder 46, herein shown as integral with cylinder 18, is journaled for rotation in shelling cage 24. The cylinder 46 has a sufficient diameter so that a generally annular space formed between the cylinder 46 and the cage 24 is slightly greater than the thickness of an ear of corn. A plurality of teeth or lugs 48 extend radially from the cylinder 46 in a helix pattern so that their periphery forms, in combination with cage 24, an average annular space slightly less than an ear of corn. As a result, rotation of the cylinder 46 causes corn to be advances from the feed chamber 14 to a discharge end 50.

Adjacent the end 50 of shelling cage 24 there is provided an adjustable barrier means 52 which may take various forms for adjustably restricting flow from outlet 50 at cage 24. As shown in FIG. 4, the adjustable barrier means 52 may comprise a pair of arcuate doors 53 pivotally mounted at their lower end to an end plate 55 of cage 24. The upper ends of doors 53 have pins 57 which are laterally displaced by a suitable actuating device to adjustably restrict flow from outlet 50 of cage 24. A barrier means particularly suitable for this purpose is found in copending U.S. Pat. application Ser. No. 716,590, filed on Mar. 27, 1968, entitled "Improvements in Corn Shellers," in the name of Ted Stott et al. and of common assignment with the present invention.

A cylindrical separator cage 54 extends from the adjustable barrier means 52 to an opening 56 in a frame member 58 to form a discharge for trash and cobs. The cage 54 has a plurality of perforations 60 having an area A substantially greater than the area $a$ for perforations 26. A cylinder 62, herein shown as integral with and of the same diameter as cylinder 46, is journaled for rotation in cage 54 by a suitable bearing assembly 64 secured to a frame member 66. A power input shaft 68 has a sprocket 72 which is adapted to receive a chain drive from a suitable power source.

The cylinder 62 and the cage 54 have relative dimensions so that they form an annular space therebetween substantially greater than the annular space between the cage 24 and cylinder 46, as illustrated by phantom line D. A series of paddles 70 extend radially from cylinders 62 to a point closely adjacent the inner side of cage 54. The paddles 70 are slightly pitched with respect to the axis of rotation for the cylinder 62 so that rotation of the cylinder 62 causes the material to be advanced in a helix pattern toward discharge opening 56.

The operation of the corn sheller and separator is as follows: the cylinders 62, 46 and 18 are put into rotation and unshelled corn separated from stalks along with some extra trash is fed into feed chamber 14. Auger 22 advances the mixture into the inlet end of cage 24. Once the mixture is in shelling cage 24, the helix pattern of teeth 48 causes the mixture to be advanced to the discharge end 50. Since the annular space between the periphery of the teeth 48 and the cage 24 is slightly less than the diameter of an ear of corn, the ears are subjected to a vigorous rubbing action against one another and against the perforated cage so that kernels of corn are separated from the cobs of the ear and pass outward through the perforations 26. Typical dimensions that have been found to be effective and may be used are an average diameter of 15½ inches for shelling cage 24 and a diameter of 9 inches for cylinder 46. It has also been found that teeth 48, having a length OF 1¼ inches, propel ears of corn effectively through shelling cage 24. The vigorous shelling action in cage 24 is further promoted by the recesses 38 which cause the mixture to be intermittently compressed as it passes through cage 24. The rasp bars 42, 44 and 40 additionally provide a vigorous rubbing action as the ears of corn pass over them.

It should be noted that the area $a$ of the perforations 26 is selected at a level which is sufficient to permit passage of kernels but blocks passage of trash or leafy material, since the mixture is packed into the cage 24. Typical dimensions for perforations 26 that have proved effective are a length of 1 inch and a width of ½ inch.

The adjustable barrier means 52 enables the flow of corn to be variably restricted for varying field conditions and to control the amount of time the individual ears of corn are subjected to the shelling action. The shelling of the corn is substantially completed in cage 24 and a large portion of the kernels pass through the perforations 26 for further processing. However, there remains a significant portion of the kernels that pass into cage 54 along with the cobs and trash.

In the separating cage 54 this mixture is propelled to the discharge end 56 by the paddles 70. The slight pitch of the paddles 70 causes the mixture to be propelled in a helical pattern and subjected to a separating action for a maximum period of time. This enhances the separation of the kernels from the mixture and through perforations 60 by centrifugal force. Since the clearance between the cylinder 62 and the cage 54 is substantially greater than that for cage 24 and cylinder 46, the mixture of the kernels and of the components is much looser than in cage 24, thereby permitting the kernels of corn to make their way to the perforations 60 in the separating cage 54. Typical dimensions that have proved effective and may be used are a diameter for cage 54 of 19 inches and a diameter for cylinder 62 of 9 inches.

It should be noted that the perforations 60 have an area A substantially larger than the area $a$ for perforations 26. This is done to insure that the kernels of corn that pass through the cage 54 are able to pass through the perforations 60. Since the trash and cobs are in a relatively loose mixture, the tendency for these components to pass through the perforations 60 is minimized. Typical dimensions that may be used for perforations 60 are a length of 1¾ inch and a width of ⅝ inch.

The above corn sheller and separator provides a highly effective means to shell corn in field operations. The small clearance in the cage 24 promotes a vigorous shelling action that is further enhanced by the rasp bars and the longitudinal recesses. This enables the sheller to accept a widely varying rat of flow for the unshelled corn since each individual ear is subjected to rubbing action by the cylinder 46 and the cage 24. Furthermore, the vigorous rubbing in cage 24 minimizes the adverse effect on shelling by an abundance of trash. The substantial clearance between the separating cage 54 and cylinder 62 enables a highly efficient separating process. This results because the clearance enables a significant reduction in power requirements to separate a given amount of kernels from the ears of corn. It should also be noted that this arrangement provides, in effect, a substantial separating area, i.e., the internal area of cage 54 to be positioned in a compact unit since the separating area is wrapped around the cylinder. This feature promotes the use of shellers and separators of this type in multiple units in a field-going machine requiring compact shelling and separating units.

Having thus described the invention, what we claim as novel and desire to be secured by Letters Patent of the United States is:

1. A corn sheller and separator comprising:
   means for forming a first generally annular elongated perforated cage adapted to receive at one end ears of corn;
   a first elongated cylinder having teeth projecting radially therefrom in a helix pattern, said cylinder being longitudinally journaled for rotation in said perforated cage means, said cylinder and said cage means forming a generally annular space therebetween slightly greater than the thickness of an ear of corn, the periphery of the teeth projecting from said cylinder forming, in combination with said cage means, so that rotation of said cylinder causes ears of corn to be helically advanced through said cage means and vigorously rubbed against one another and the perforated cage means whereby the kernels are separated from the cob and trash of the ear and a portion of the kernels pass outwardly through the perforations in said first cage means;
   means for forming a second generally annular elongated perforated cage extending from the opposite end of said first cage means and having an open end for discharge of trash and cobs;
   a second elongated cylinder extending from said first cylinder through said second cage means and journaled for rotation therein, said second cylinder and second cage means forming an annular space substantially greater than the annular space between said first cage means and said first coaxial cylinder for permitting a loose mixture of kernels, ears and trash; and
   means extending radially and helically from said second cylinder to a position closely adjacent the said second cage means for propelling the remaining kernels, trash and cobs in a helical pattern through said second cage means whereby the remaining kernels pass outwardly through the perforations of said second cage means.

2. A corn sheller and separator as in claim 1 wherein:
   said first and second cylinders are formed from a unitary, uniform-diameter cylinder extending through said first and second cage means;
   said second cage means is substantially larger than said first cage means to form said larger annular space.

3. A corn sheller and separator as in claim 1 wherein said propelling means comprises a plurality of paddles extending radially from said second cylinder and being pitched with respect to the second cylinder's axis of rotation.

4. A corn sheller and separator as in claim 1 wherein a series of longitudinally extending recesses are formed in said first cage means whereby the ears of corn are intermittently compressed as they advance through said first cage means.

5. A corn sheller and separator as in claim 4 wherein said first cage means is formed from three symmetrical arcuate sections secured to one another along their length and curved to a radius greater than the average radius of the resultant generally annular cage whereby a series of three shallow longitudinal recesses are formed.

6. A sheller and separator as in claim 1 wherein;
the perforations in said first cage means are positioned around its periphery and the perforations have sufficient area to permit only the passage of kernels of corn and block passage of trash resulting from the pressure on the cobs and trash in said first cage means;
the perforations in said second cage means are positioned around its periphery, said perforations being substantially larger than the perforations for said first cage means so that passage of kernels therethrough is maximized.

7. A corn sheller and separator as in claim 1 wherein;
said first and second cylinders are formed from a unitary uniform diameter cylinder extending through said first and second cage means;
said second cage means is substantially larger than said first cage means to form said increased annular space;
said propelling means comprises a plurality of paddles extending radially from said second cylinder and being pitched with respect to the axis of rotation for said cylinder whereby the paddles propel said remaining kernels, trash and cobs.

8. A corn sheller and separator as in claim 7 wherein a series of longitudinal recesses are formed in said first cage means whereby the ears of corn are intermittently compressed as they advance through said first cage means.

9. A corn sheller and separator as in claim 8 further comprising at least one longitudinal rasp bar positioned between two adjacent recesses in said first cage means for more aggressively rubbing said ears of corn.

10. A sheller and separator as in claim 9 wherein;
said first cage means is formed from these symmetrical arcuate sections secured to one another along their length and curved to a radius greater than the average radius of the resultant annular cage whereby a series of three shallow longitudinal recesses are formed.

11. A sheller and separator as in claim 10 further comprising means for forming an adjustable barrier between said first and second cage means whereby the flow of corn through said first cage means is restricted.

12. A sheller and separator as in claim 11 wherein:
the perforations in said first cage means are positioned around its periphery and the perforations have sufficient area to permit only the passage of kernels of corn and block passage of trash resulting from the pressure on the cobs and trash in said first cage means;
the perforations in said second cage means are positioned around its periphery, said perforations being substantially larger than the perforations for said first cage means so that passage of kernels therethrough is maximized.

PO-1050
(5/69)

UNITED STATES PATENT OFFICE
CERTIFICATE OF CORRECTION

Patent No. 3,590,824          Dated  July 6, 1971

Inventor(s)  Lyman J. Gunyou and Robert A. Stelzer

It is certified that error appears in the above-identified patent and that said Letters Patent are hereby corrected as shown below:

Col. 2, line 45, "cage 14" should read -- cage 24 -- ;

line 67, "advances" should read -- advanced -- .

Col. 4, line 14, "rat" should read -- rate -- ;

line 42 (Claim 1), after "in combination with said cage means," insert -- an average annular space slightly less than an ear of corn, -- .

Col. 6, line 11 (Claim 10), "these" should read -- three -- .

Signed and     ed this 22nd day of February 1972.

(SEAL)
Attest:

EDWARD M. FLETCHER, JR.           ROBERT GOTTSCHALK
Attesting Officer                 Commissioner of Patents